(12) United States Patent
Takeuchi

(10) Patent No.: US 10,690,204 B1
(45) Date of Patent: Jun. 23, 2020

(54) BRAKE CALIPER AND METHOD OF MAKING BRAKE CALIPER

(71) Applicant: ADVICS North America, Inc., Lebanon, OH (US)

(72) Inventor: Masakazu Takeuchi, Novi, MI (US)

(73) Assignee: ADVICS CO., LTD., Kariya-Shi, Aichi-Ken (JP)

( * ) Notice: Subject to any disclaimer, the term of this patent is extended or adjusted under 35 U.S.C. 154(b) by 18 days.

(21) Appl. No.: 16/219,165

(22) Filed: Dec. 13, 2018

(51) Int. Cl.
| | |
|---|---|
| *F16D 65/18* | (2006.01) |
| *F16D 65/00* | (2006.01) |
| *F16D 55/226* | (2006.01) |
| *F16J 15/50* | (2006.01) |
| *F16D 65/78* | (2006.01) |
| *F16D 121/02* | (2012.01) |
| *F16D 55/00* | (2006.01) |

(52) U.S. Cl.
CPC .......... *F16D 65/18* (2013.01); *F16D 55/226* (2013.01); *F16D 65/0068* (2013.01); *F16D 65/78* (2013.01); *F16J 15/50* (2013.01); *F16D 2055/0016* (2013.01); *F16D 2065/785* (2013.01); *F16D 2121/02* (2013.01); *F16D 2250/0084* (2013.01)

(58) Field of Classification Search
CPC ............. F16D 65/18; F16J 3/043; F16J 3/046
USPC ....... 188/72.4, 264 G, 370; 277/634; 92/168
See application file for complete search history.

(56) References Cited

U.S. PATENT DOCUMENTS

| | | | | |
|---|---|---|---|---|
| 3,497,038 | A * | 2/1970 | Hans ................... | F16D 65/84 188/370 |
| 4,121,845 | A * | 10/1978 | Reynolds .......... | F16D 55/22655 188/72.4 |
| 4,506,768 | A * | 3/1985 | Innocent ................. | F16D 65/18 188/370 |
| 4,524,677 | A * | 6/1985 | Ashman ................. | F16D 65/18 188/72.4 |
| 4,537,289 | A * | 8/1985 | VonGrunberg ..... | F16D 65/0979 188/264 G |
| 5,048,648 | A * | 9/1991 | Le Deit ................... | F16D 65/18 188/370 |
| 7,097,004 | B2 * | 8/2006 | Barrett ..................... | F16J 3/046 188/72.4 |
| 7,905,336 | B2 * | 3/2011 | Cortinovis ............... | F16J 3/043 188/370 |

(Continued)

FOREIGN PATENT DOCUMENTS

| | | |
|---|---|---|
| JP | 2002327849 A | 11/2002 |
| WO | 2014147548 A1 | 9/2014 |

*Primary Examiner* — Christopher P Schwartz
(74) *Attorney, Agent, or Firm* — Buchanan Ingersoll & Rooney PC

(57) ABSTRACT

A brake caliper apparatus includes a caliper portion configured to be supported by a vehicle, a piston seal disposed in an annular cavity of the caliper portion, a piston disposed in a cylindrical recess in said caliper portion and having a cylindrical outer surface in sealing contact with the piston seal, the piston being movable within said cylindrical recess along an axial direction, a heat shield disposed at an axial end of the piston, and a sealing boot having a first end attached to the heat shield at an attachment portion of the heat shield and a second end engaged to the caliper portion at an engagement portion of the caliper portion, the piston seal and the engagement portion being on a common plane perpendicular to the axial direction.

11 Claims, 8 Drawing Sheets

(56) References Cited

U.S. PATENT DOCUMENTS

| | | | |
|---|---|---|---|
| 10,378,598 B2 * | 8/2019 | Scotti | F16J 3/02 |
| 2004/0026194 A1 * | 2/2004 | Cortinovis | F16J 3/043 |
| | | | 188/218 A |

* cited by examiner

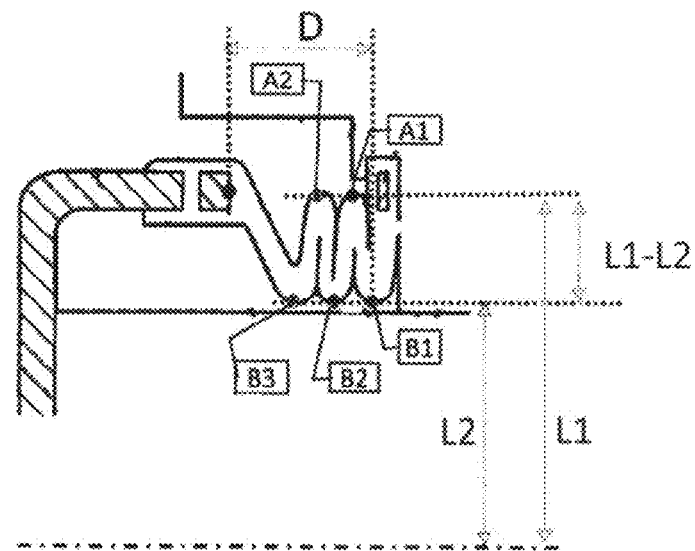
FIG. 2
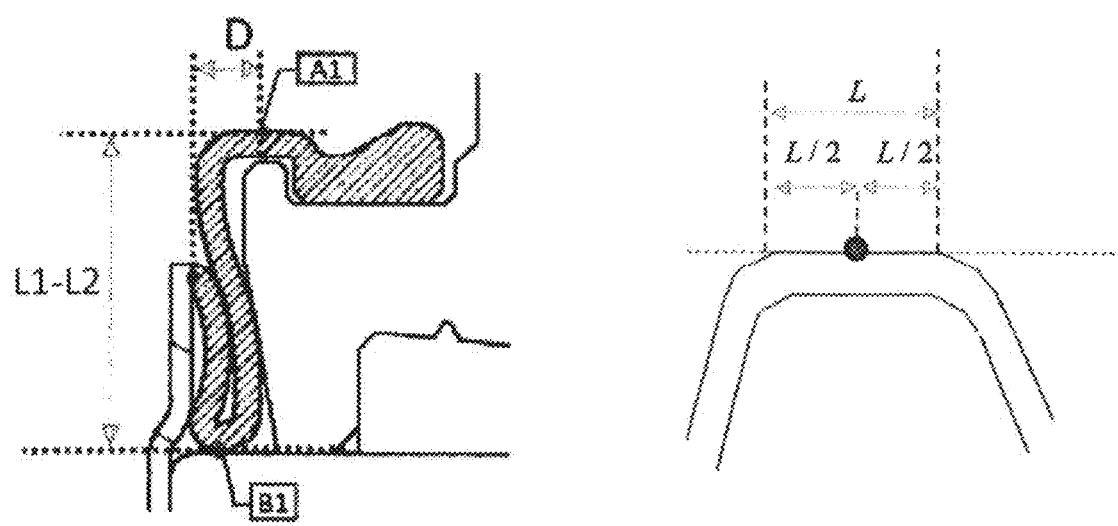
FIG. 3
FIG. 4

BRAKE CALIPER AND METHOD OF MAKING BRAKE CALIPER

TECHNICAL FIELD

The present invention generally relates to a brake caliper and a method of making the brake caliper.

BACKGROUND DISCUSSION

As the demand for hybrid electric and electric vehicles has increased, so has the demand for larger diameter, narrower width tires for improved rolling resistance and aerodynamics for use on such vehicles. However, the use of such tires necessitates space-saving measures in the design of the brakes. One significant space saving measure involves shortening the axial length of the brake calipers. However, previous attempts to redesign brake calipers to shorten the axial length have presented problems. For example, one previous design, as illustrated in FIG. 11, involves arranging the sealing boot so that its bellows is compressed in the radial direction. However, the walls of the bellows extend axially in this arrangement, limiting the axial shortening. Other attempts to shorten the axial length do not provide sufficient freedom of deformation of the sealing boot. Accordingly, a need exists for a brake caliper which is suitably axially shortened while providing sufficient freedom of deformation of the sealing boot and avoiding other drawbacks.

SUMMARY

A brake caliper apparatus according to the present disclosure includes a caliper portion configured to be supported by a vehicle, a piston seal disposed in an annular cavity of the caliper portion, a piston disposed in a cylindrical recess in said caliper portion and having a cylindrical outer surface in sealing contact with the piston seal, the piston being movable within said cylindrical recess along an axial direction, a heat shield disposed at an axial end of the piston, and a sealing boot having a first end attached to the heat shield at an attachment portion of the heat shield and a second end engaged to the caliper portion at an engagement portion of the caliper portion. The piston seal and the engagement portion are on a common plane perpendicular to the axial direction.

A method of making a brake caliper apparatus according to the present disclosure includes disposing a piston seal in an annular cavity of a caliper portion which is configured to be supported by a vehicle, disposing a piston in a cylindrical recess in the caliper portion so that a cylindrical outer surface of the piston is in sealing contact with the piston seal and the piston is movable within said cylindrical recess along an axial direction, attaching a first end of a sealing boot to a heat shield at a an attachment portion of the heat shield, disposing the heat shield at an axial end of the piston, and engaging a second end of the sealing boot to the caliper portion at an engagement portion of the caliper portion. The piston seal and the engagement portion are on a common plane perpendicular to the axial direction.

Another brake caliper apparatus according to the present disclosure includes a caliper portion configured to be supported by a vehicle, a piston seal disposed in an annular cavity of the caliper portion, a piston disposed in a cylindrical recess in said caliper portion and having a cylindrical outer surface in sealing contact with the piston seal, the piston being movable within said cylindrical recess along an axial direction, a heat shield disposed at an axial end of the piston, and a sealing boot having a first end attached to the heat shield at an attachment portion of the heat shield and a second end engaged to the caliper portion at an outer circumferential surface of the caliper portion. The heat shield disposed at the axial end of the piston has the attachment portion at least 2 mm further outward in a radial direction than the cylindrical outer surface of the piston. Furthermore, when the piston is moved to a maximum extent into the cylindrical recess in the caliper portion, $(L1-L2)/D > 2.0$, with L1 being a maximum radial distance between the at least one outer turn and a central axis of the piston or a radial distance between the attachment portion and the central axis of the piston, whichever is larger, L2 being a minimum radial distance between the at least one inner turn and the central axis of the piston, and D being an axial distance between the attachment portion and a center point of the turn furthest from the attachment portion in the axial direction.

BRIEF DESCRIPTION OF THE DRAWINGS

FIG. 2 illustrates a schematic view of relative dimensions of a brake caliper apparatus.

FIG. 3 illustrates a cross-sectional view of the relative dimensions of FIG. 2 for a brake caliper apparatus of according to exemplary embodiments.

FIG. 4 illustrates a schematic view of the location of the measurement position of a turn for length D in the relative dimensions of FIGS. 2 and 3.

DETAILED DESCRIPTION

Figure 1:
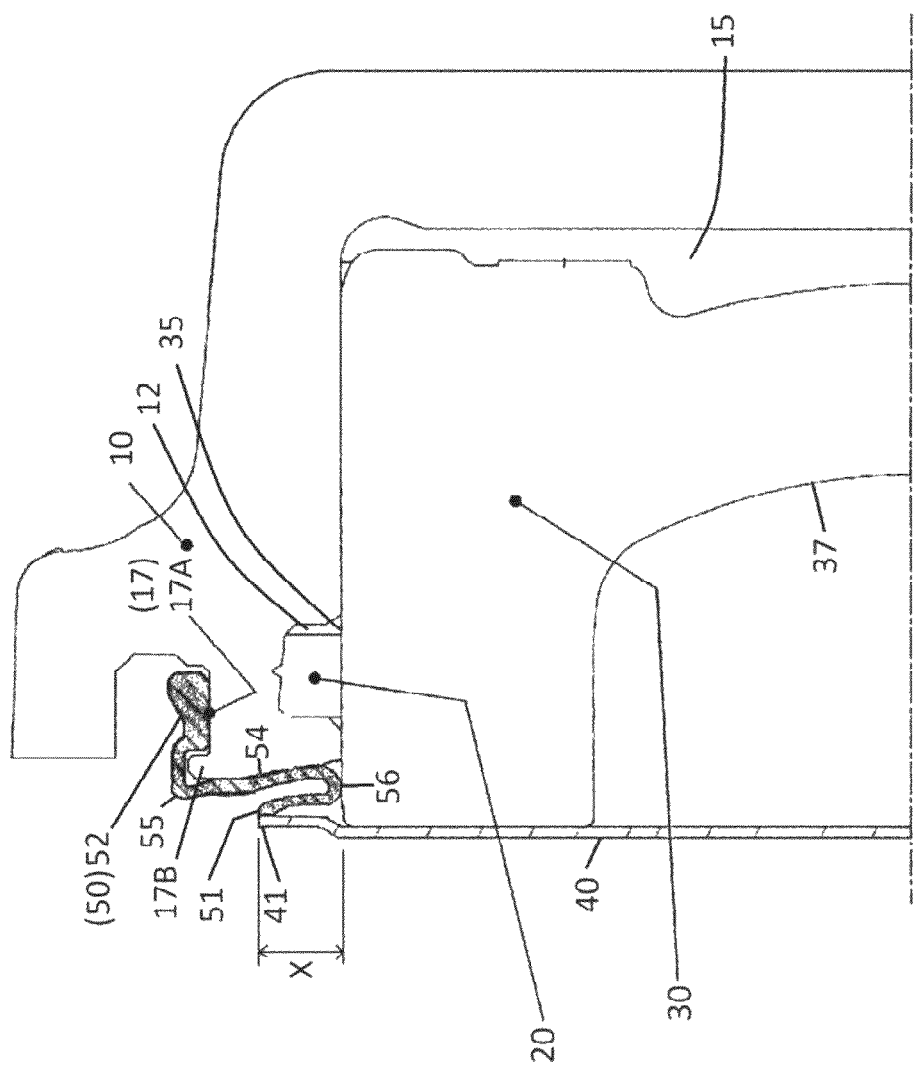
FIG. 1 illustrates a cross-sectional view of a first embodiment of a brake caliper apparatus at one side of a central axis of the brake piston.

FIG. 1 illustrates an embodiment of a brake caliper apparatus according to the present disclosure. The apparatus includes a caliper portion 10 forming the outboard side of a fixed-brake caliper. The caliper portion 10 is configured to be supported by a vehicle, via, for example, a corresponding inboard side of a fixed-brake caliper which is fixed to the vehicle via an anchor plate. The apparatus also includes a piston seal 20 disposed in an annular cavity 12 of the caliper portion 10 and a piston 30 disposed in a cylindrical recess 15 in the caliper portion 10 and movable within the caliper portion 10 along the axial direction. The piston 30 has a concavity 37 formed in its axial end and cylindrical outer surface 35 in sealing contact with the piston seal 20 and forming a small clearance with the cylindrical recess 15.

A heat shield 40 is disposed at an axial end of the piston 30 opposite the bottom of the cylindrical recess 15 and covers the concavity 37. The heat shield 40 is generally plate-shaped and is typically formed of a plated steel. The heat shield 40 is configured to shield the piston 30, and brake fluid, as well as sealing boot 50 which is described in detail below, from the heat generated from braking.

Upon actuation of the brake associated with the apparatus, pressurized brake fluid is introduced into the cylindrical recess 15 behind the piston 30 via passageways in the caliper portion 10 in the known manner, and the piston 30 is forced in the direction away from the bottom of the cylindrical recess 15. The piston 30, via the heat shield 40, pushes the brake pad toward the brake disc, thereby effecting braking of the vehicle. The piston seal 20 cooperates with the walls of the annular cavity 12 and the cylindrical outer surface 35 of the piston 30 to prevent the escape of brake fluid from the cylindrical recess 15 through the small clearance between the cylindrical outer surface 35 of the piston 30 and the cylindrical recess 15. A corresponding inboard side brake caliper and brake pad are provided on the other side of the brake disc in a conventional manner.

The apparatus also includes sealing boot 50 for preventing debris or other material from entering the small clearance between the cylindrical outer surface 35 of the piston 30 and the cylindrical recess 15 of the caliper portion 10. A first end 51 of the sealing boot 50 is attached to an attachment portion 41 of the heat shield 40, and a second end 52 of the sealing boot 50 is engaged to an engagement portion 17 of the caliper portion 10.

In the illustrated embodiment, the attachment portion 41 is a radially outermost portion of an axially rearward facing surface of the heat shield 40, and the engagement portion 17 includes a cylindrical surface 17A and radially-extending lip 17B of the caliper portion 10. However, in alternative embodiments, the attachment portion can be at another part of the axially rearward facing surface of the heat shield, such as the attachment portion 41A illustrated in FIG. 7, or at a radially outward facing surface of the heat shield, such as the attachment portion 41B illustrated in FIG. 8.

The sealing boot 50 also includes a bellows-shaped portion between the first end 51 and the second end 52. The bellows-shaped portion is configured to permit relative movement between the first end 51 of the sealing boot 50 and the second end 52 of the sealing boot 50 as the piston 30 moves relative to the caliper portion 10. As illustrated in FIG. 1, the bellows-shaped portion has a plurality of walls 54 arranged along the axial direction, and one or more outer turns 55 and inner turns 56 at the radially outer and inner sides of the plurality of walls 54.

In the illustrated embodiment of the disclosed brake caliper apparatus, the piston seal 20 and the engagement portion 17 of the caliper portion 10 are on a common plane perpendicular to the axial direction. The piston seal 20 must be provided sufficiently toward the front of the caliper portion 10 to maintain the seal when the piston operates the brake, and also to slide forward to adjust for brake pad wear. Thus, providing the engagement portion directly above the piston seal 20, and not in front of the piston seal, can reduce the axial length of the caliper portion 10.

Figure 8:
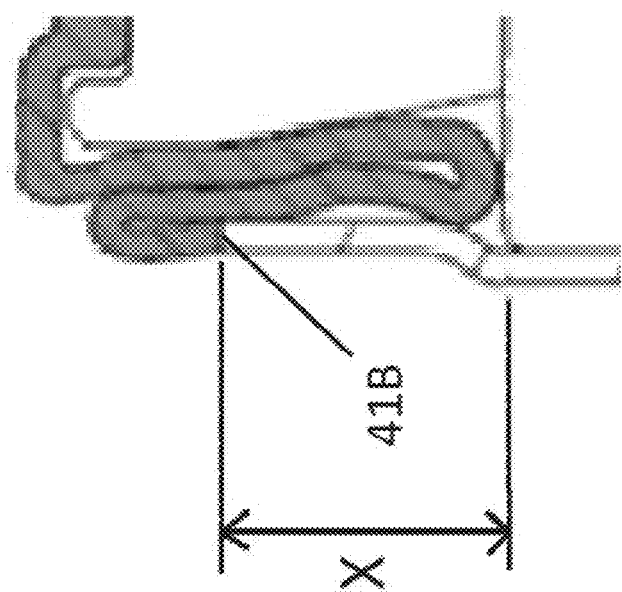
FIG. 8 illustrates a cross-sectional view of an attachment portion according to an alternative embodiment.
Figure 7:
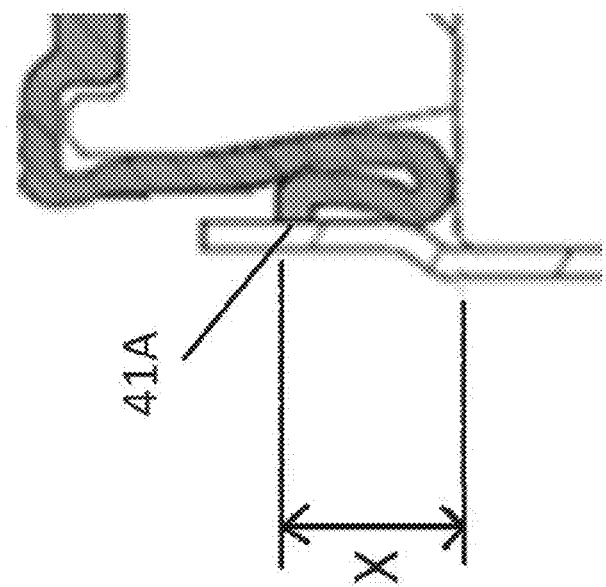
FIG. 7 illustrates a cross-sectional view of an attachment portion according to an alternative embodiment.
Figure 10:
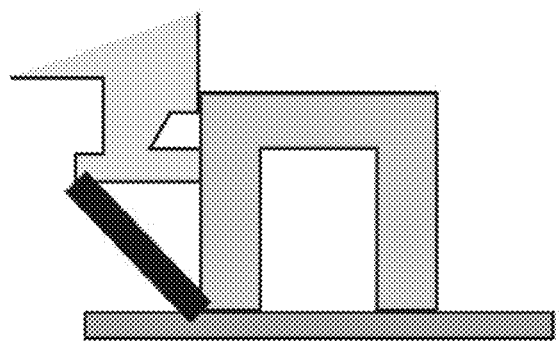
FIG. 10 illustrates a schematic view of a brake caliper apparatus according to a comparative example with the piston moved a maximum distance.
Figure 9:
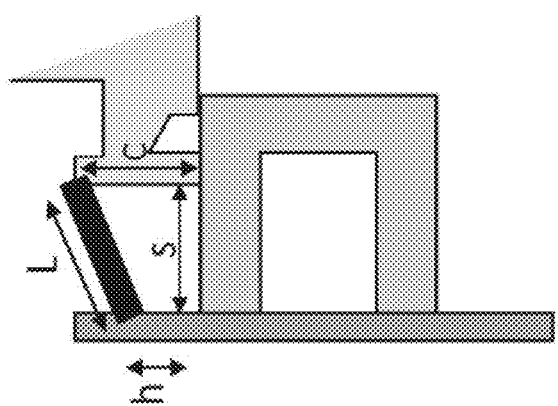
FIG. 9 illustrates a schematic view of a brake caliper apparatus according to an embodiment with the piston moved a maximum distance.
Figure 11:
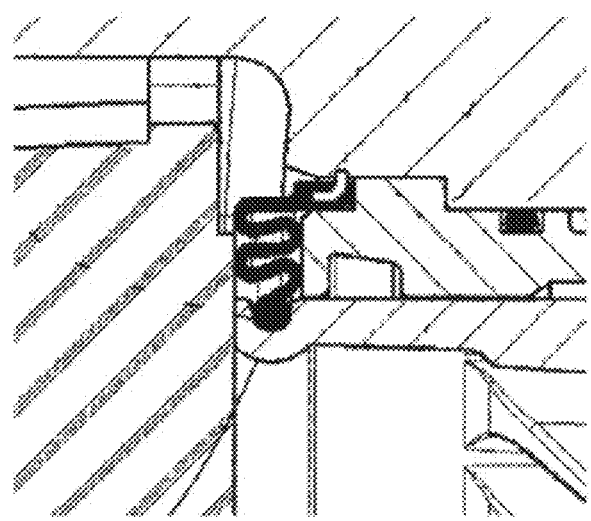
FIG. 11 illustrates a partial cross-sectional view of a prior art brake caliper.

Furthermore, the attachment portion 41 of the heat shield 40 is provided to be at least 2 mm further outward in the radial direction than the cylindrical outer surface 35 of the piston 30 (i.e., the distance X in FIGS. 1, 7 and 8 is at least 2 mm). In particular, as illustrated in FIG. 9, for a required maximum distance S as required to accommodate for brake lining wear, the required length L of the bellows, when fully straightened out, will be shorter than in the comparative example illustrated in FIG. 10 in which the heat shield attachment portion is at or very close to the outer surface of the cylinder. In other words, for a constant height C, which is determined by the geometry of the brake housing, and a constant maximum distance S for accommodating brake lining wear, the length L of the bellows given by $L=((C-X)^2+S^2)^{0.5}$ decreases as X approaches C. Thus, by decreasing the length L, the amount of storage space required for the bellows when in a folded condition will decrease.

FIG. 2 illustrates relative dimensions of a brake caliper, in which L1 is a maximum radial distance (amongst the radial distances A1 and A2) between the outer turns and a central axis of the piston or the radial distance between the attachment portion and the central axis of the piston, whichever is larger, L2 being a minimum radial distance (amongst the radial distances B1, B2, and B3) between the inner turns and the central axis of the piston, and D being the axial distance between the attachment portion 41 of the heat shield 40 and the center point of the turn furthest from the attachment portion 41 of the heat shield 40 in the axial direction. It has been found that optimum performance and axial shortening of the brake caliper apparatus can be attained when its configuration is such that, when the piston is moved to a maximum extent into the cylindrical recess 15 in the caliper portion 10, the following relationship is attained: (L1−L2)/D>2.0 (i.e., the difference between L1 and L2 divided by the distance D is greater than 2.0). FIG. 3 shows an example in which the ratio (L1−L2)/D is 5.0, which satisfies the noted relationship. Also illustrated in that figure is an example of the maximal radial distance between an outer turn and the central axis being provided on a turn (turn A1) with a relatively large flat area by virtue of the turn transitioning to the second end of the sealing boot. By contrast, the turn B1 does not have such a relatively large flat area. For turns such as turn A1 with a relatively large flat area, the middle of the flat portion in the axial direction is used as the center point of the turn for purposes of calculating distance D, as illustrated in FIG. 4.

The FIG. 1 embodiment includes a caliper portion 10 for an outboard side of a fixed-brake caliper 10. However, axial shortening of an inboard side of a fixed-brake caliper, or of a floating brake caliper, can also be advantageous, and so its features can also be advantageously applied to a caliper portion for an inboard side of a fixed-brake caliper, or a floating brake caliper.

Figure 5:
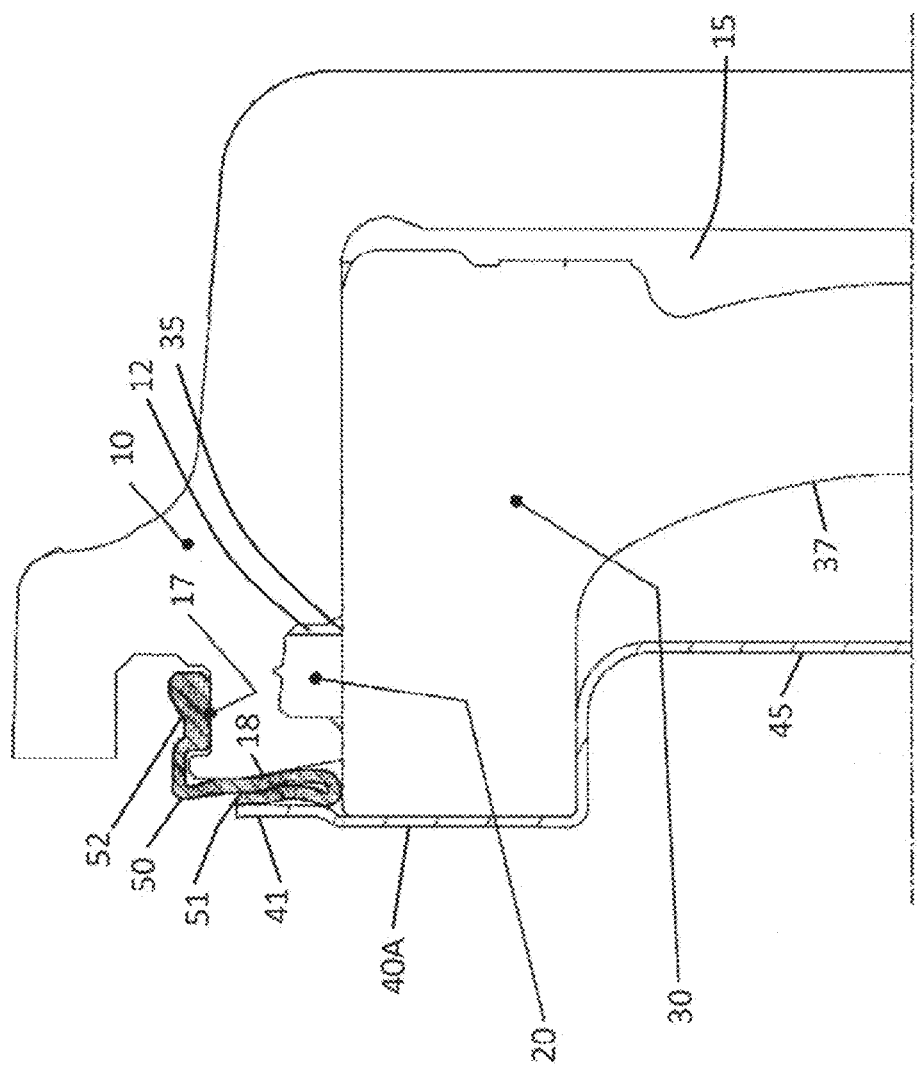
FIG. 5 illustrates a cross-sectional view of a second embodiment of a brake caliper apparatus at one side of a central axis of the brake piston.

FIG. 5 illustrates a second embodiment of a brake caliper apparatus according to the present disclosure. The caliper portion 10, piston seal 20, piston 30, and sealing boot 50 have the same configuration as in the embodiment of FIG. 1. The heat shield 40a differs in that it includes a projecting portion 45 configured to be interference fit into the concavity 37, thereby fixing the heat shield 40a at the axial end of the piston 30a. With this arrangement, the sealing boot 50 can be compressed between the heat shield 40a and a sidewall 18 of the caliper portion 10, thereby permitting further axial shortening.

Figure 6:
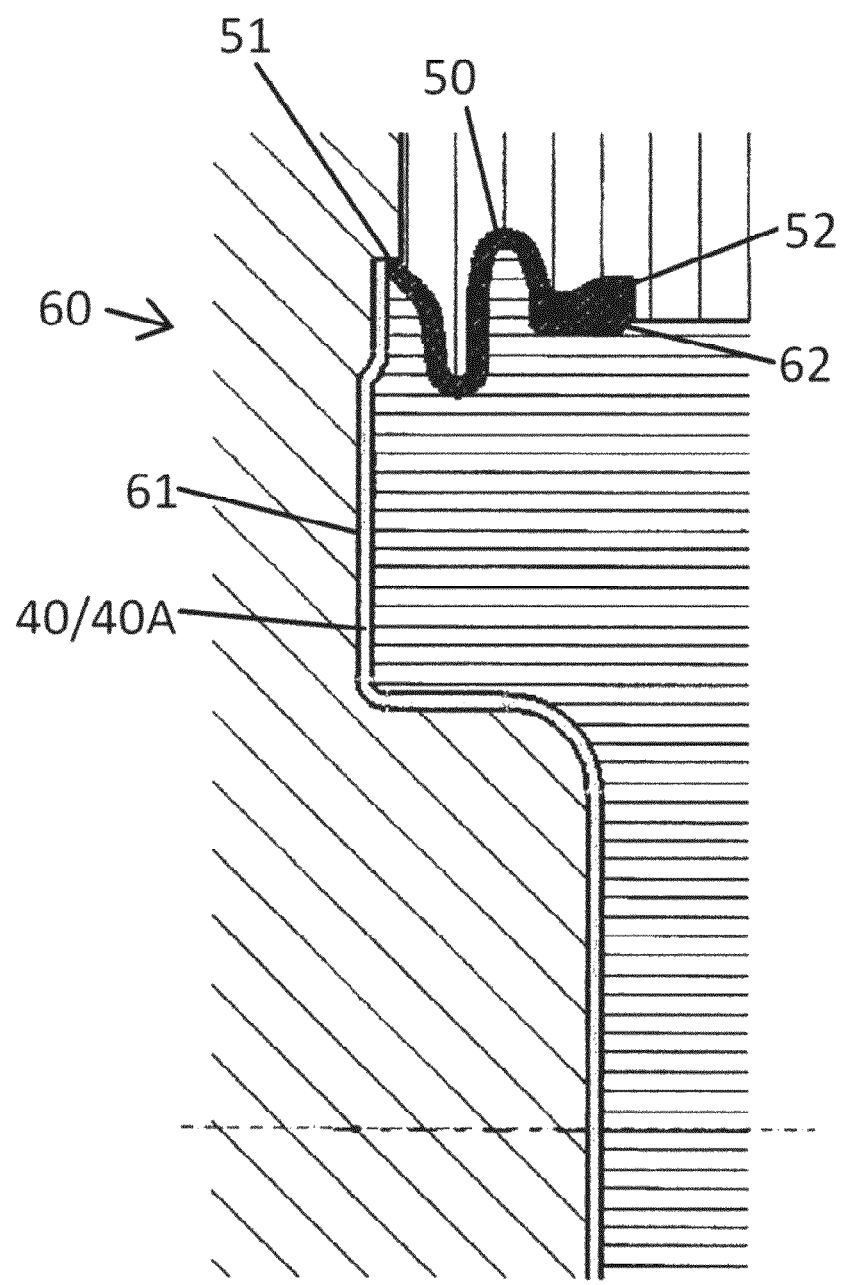
FIG. 6 illustrates a cross-sectional view of a mold for forming a sealing boot and fixing it to a heat shield of a brake caliper apparatus.

A method of making a brake caliper apparatus will now be described. The piston seal 20 is disposed in the annular cavity 12 of the caliper portion 10 and the piston 30 disposed in the cylindrical recess 15 in the caliper portion 10. The sealing boot 50 is formed and its first end 51 attached to the attachment portion 41 of the heat shield 40, in a manner discussed in detail below. The heat shield 40 is then disposed at the axial end of the piston 30 (or fixed to the axial end of the piston 30a in the FIG. 5 embodiment). Finally, the second end 52 of the sealing boot 50 is engaged to the engagement portion 17 of the caliper portion 10. As best seen in FIG. 6, discussed below, the second end 52 of the sealing boot 50 in its free state is radially inward of its position when engaged to the engagement portion 17. Thus, when the second end 52 is pulled outward just prior to engagement with the engagement portion 17 and then released, it urges itself inward over the lip 17B of the engagement portion 17 and against the cylindrical surface 17A of the engagement portion 17 to firmly engage with the engagement portion 17.

The sealing boot 50 may be made from a cross-linkable rubber such as EPDM (ethylene propylene diene monomer). A mold 60 having a first clearance 61 in the shape of the heat shield 40/40A and a second clearance 62 in the desired shape of the sealing boot 50 is provided, as illustrated in FIG. 6. The heat shield 40/40A is placed in the first clearance 61, the cross-linkable rubber (prior to being cross-linked) is placed in the into the second clearance 62, and the mold closed. The molding process can be, for example, compression molding or injection molding. For compression molding, the rubber placed into the second clearance 62 will have been pre-formed of a ring or sheet. For injection molding, the rubber, which has a decreased viscosity due to pre-heating, is injected into the clearance 62 without pre-forming.

The mold, which has been pre-heated to a temperature sufficient to cross-link the rubber, causes the rubber to simultaneously cross-link in the shape of the sealing boot 50 and cross-link adhere to the heat shield 40/40A. Triazinethol may be blended into the rubber, and the heat shield 40/40A may be plated with Ni—P, to enhance cross-linking adhesion between the rubber and the heat shield 40/40A. The resultant heat shield/sealing boot assembly is illustrated in FIG. 5. By forming the assembly in this way, the joining of the sealing boot 50 to the heat shield 40/40A can be reliably achieved. At the same time, heat resistance, peeling force, bonding position accuracy and corrosion resistance can be improved. Furthermore, the disclosed manufacturing method and integrated sealing boot 50 and heat shield 40/40A advantageously make possible a more compact arrangement. This is in contrast to other techniques in which the sealing boot and the heat shield are joined either by adhesive bonding or by bending the heat shield, both of which severely limit the effective length of the piston boot bellows.

Figure 12:
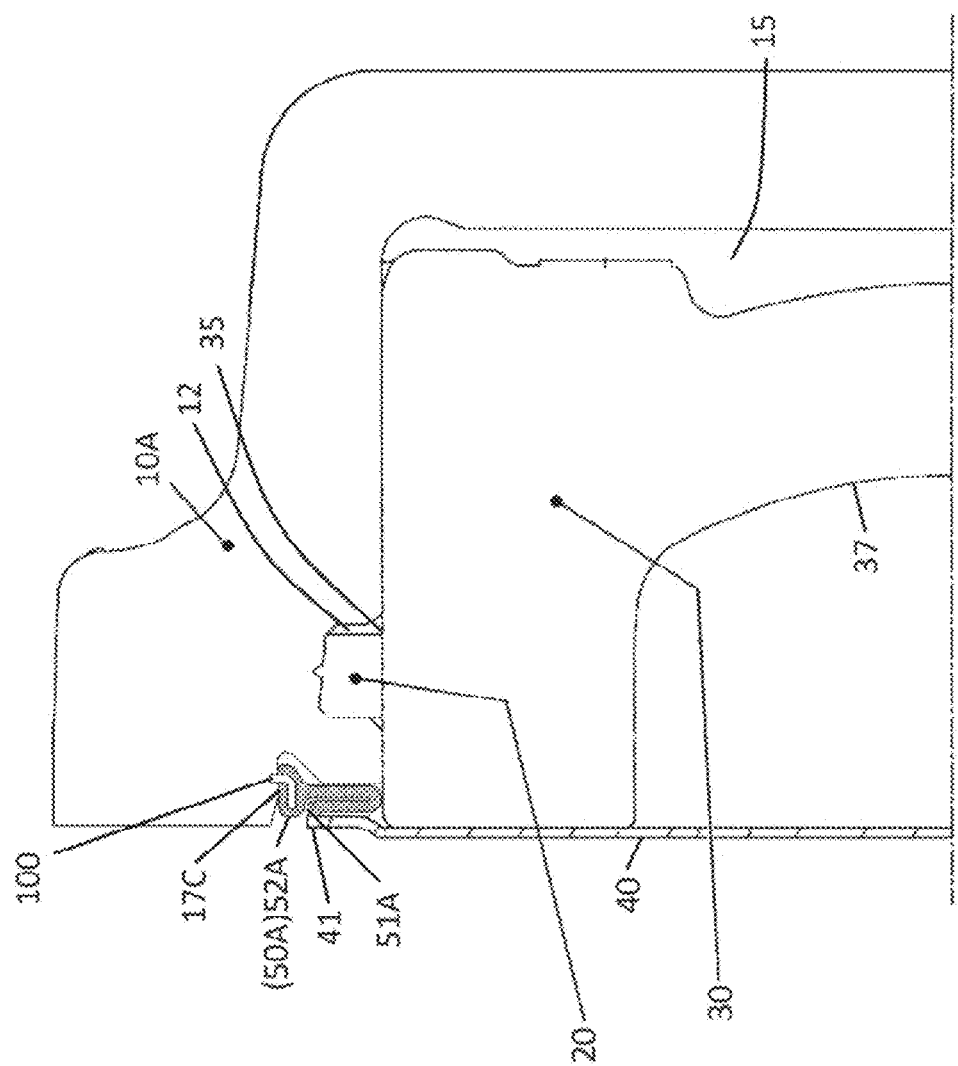
FIG. 12 illustrates a cross-sectional view of a third embodiment of a brake caliper apparatus at one side of a central axis of the brake piston.

In the embodiments of FIGS. 1 and 5, the engagement portion of the caliper portion is an outer circumferential surface of the caliper portion. However, the engagement portion can also be an inner circumferential surface, as shown in the third embodiment illustrated in FIG. 12. In this embodiment, the components are the same as the embodiments of FIG. 1, except that the caliper portion 10A has an inner circumferential surface 17C from which an attachment hook 100 protrudes, and the second end 52A has a configuration in which it can attach to the attachment hook 100 and remain engaged with the inner circumferential surface. As in the embodiments of FIGS. 1 and 5, a first end 51A of the sealing boot 50A is attached to an attachment portion 41 of the heat shield 40, and a bellows-shaped portion having a plurality of walls arranged in the axial direction between the first end 51A and the second end 52A permits relative movement therebetween as the piston 30 moves relative to the caliper portion 10A. Furthermore, as in the embodiments of FIGS. 1 and 5, the attachment portion 41 of the heat shield 40 is provided to be at least 2 mm further outward in the radial direction than the cylindrical outer surface 35 of the piston 30, and the relationships discussed above with respect to FIG. 2 are satisfied.

The detailed description above describes a brake caliper and a method of making a brake caliper. The invention is not limited, however, to the precise embodiments and variations described. Various changes, modifications and equivalents can be effected by one skilled in the art without departing from the spirit and scope of the invention as defined in the accompanying claims. It is expressly intended that all such changes, modifications and equivalents which fall within the scope of the claims are embraced by the claims.

What is claimed is:

1. A brake caliper apparatus, comprising:
   a caliper portion configured to be supported by a vehicle;
   a piston seal disposed in an annular cavity of the caliper portion;
   a piston disposed in a cylindrical recess in said caliper portion and having a cylindrical outer surface in sealing contact with the piston seal, said piston being movable within said cylindrical recess along an axial direction;
   a heat shield disposed at an axial end of the piston; and
   a sealing boot having a first end attached to the heat shield at an attachment portion of the heat shield, a second end engaged to the caliper portion at an engagement portion of the caliper portion, and a bellows-shaped portion having a plurality of walls arranged along the axial direction between the first end and the second end, the piston seal and the engagement portion being on a common plane perpendicular to the axial direction.

2. The brake caliper apparatus of claim 1, wherein the attachment portion is at least 2 mm further outward in a radial direction than the cylindrical outer surface of the piston.

3. The brake caliper apparatus of claim 2, wherein, when the piston is moved to a maximum extent into the cylindrical recess in the caliper portion, $(L1-L2)/D>2.0$, with L1 being a maximum radial distance between the at least one outer turn and a central axis of the piston or a radial distance between the attachment portion and the central axis of the piston, whichever is larger, L2 being a minimum radial distance between the at least one inner turn and the central axis of the piston, and D being an axial distance between the attachment portion and a center point of the turn furthest from the attachment portion in the axial direction.

4. The brake caliper apparatus of claim 3, wherein a concavity is formed in the axial end of the piston and the heat shield includes a projecting portion interference fit into the concavity to fix the heat shield at the axial end of the piston.

5. A method of making a brake caliper apparatus, comprising:
   disposing a piston seal in an annular cavity of a caliper portion which is configured to be supported by a vehicle;
   disposing a piston in a cylindrical recess in said caliper portion so that a cylindrical outer surface of the piston is in sealing contact with the piston seal and the piston is movable within said cylindrical recess along an axial direction;
   attaching a first end of a sealing boot to a heat shield at a an attachment portion of the heat shield;
   disposing the heat shield at an axial end of the piston; and
   engaging a second end of the sealing boot to the caliper portion at an engagement portion of the caliper portion, the piston seal and the engagement portion being on a common plane perpendicular to the axial direction, so that a bellows-shaped portion of the sealing boot between the first end and the second end has a plurality of walls arranged along the axial direction.

6. The method of claim 5, wherein the sealing boot is made from cross-linked rubber, and the attaching of first end of the sealing boot to the heat shield at the attachment portion comprises cross-link adhering the first end of the sealing boot to the attachment portion simultaneously with reaction forming the cross-linked rubber.

7. The method of claim 6, wherein the heat shield disposed at the axial end of the piston has the attachment portion at least 2 mm further outward in a radial direction than the cylindrical outer surface of the piston.

8. The method of claim 7, wherein, when the piston is moved to a maximum extent into the cylindrical recess in the caliper portion, (L1−L2)/D>2.0, with L1 being a maximum radial distance between the at least one outer turn and a central axis of the piston or a radial distance between the attachment portion and the central axis of the piston, whichever is larger, L2 being a minimum radial distance between the at least one inner turn and the central axis of the piston, and D being an axial distance between the attachment portion and a center point of the turn furthest from the attachment portion in the axial direction.

9. The method of claim 8, wherein the disposing of the heat shield at the axial end of the piston comprises interference fitting a projecting portion of the heat shield into a concavity formed in the axial end of the piston to fix the heat shield at the axial end of the piston.

10. A brake caliper apparatus, comprising:
a caliper portion configured to be supported by a vehicle;
a piston seal disposed in an annular cavity of the caliper portion;
a piston disposed in a cylindrical recess in said caliper portion and having a cylindrical outer surface in sealing contact with the piston seal, said piston being movable within said cylindrical recess along an axial direction;
a heat shield disposed at an axial end of the piston; and
a sealing boot having a first end attached to the heat shield at an attachment portion of the heat shield, a second end engaged to the caliper portion at an outer circumferential surface of the caliper portion, and a bellows-shaped portion having a plurality of walls arranged along the axial direction between the first end and the second end, the sealing boot further having at least one outer turn and at least one inner turn,
wherein the heat shield disposed at the axial end of the piston has the attachment portion at least 2 mm further outward in a radial direction than the cylindrical outer surface of the piston, and
when the piston is moved to a maximum extent into the cylindrical recess in the caliper portion, (L1−L2)/D>2.0, with L1 being a maximum radial distance between the at least one outer turn and a central axis of the piston or a radial distance between the attachment portion and the central axis of the piston, whichever is larger, L2 being a minimum radial distance between the at least one inner turn and the central axis of the piston, and D being an axial distance between the attachment portion and a center point of the turn furthest from the attachment portion in the axial direction.

11. The brake caliper apparatus of claim 10, wherein a concavity is formed in the axial end of the piston and the heat shield includes a projecting portion interference fit into the concavity to fix the heat shield at the axial end of the piston.

* * * * *